United States Patent [19]

McGahern

[11] 4,143,457

[45] Mar. 13, 1979

[54] METHOD OF MAKING MOUNTING ASSEMBLY FOR LAMINATED ROTOR RIM OF DYNAMOELECTRIC GENERATOR ROTATABLE ABOUT INCLINED SHAFT

[75] Inventor: William J. McGahern, Schenectady, N.Y.

[73] Assignee: General Electric Company, Schenectady, N.Y.

[21] Appl. No.: 875,959

[22] Filed: Feb. 8, 1978

Related U.S. Application Data

[62] Division of Ser. No. 778,096, Mar. 16, 1977, Pat. No. 4,110,652.

[51] Int. Cl.² .............................................. H02K 15/02
[52] U.S. Cl. ........................................ 29/598; 29/447; 310/42
[58] Field of Search ........................ 29/598, 447, 609; 310/261, 216–218, 42

[56] References Cited

U.S. PATENT DOCUMENTS

| | | | |
|---|---|---|---|
| 3,187,213 | 6/1965 | Seidl et al. | 310/261 X |
| 3,935,490 | 1/1976 | Spirk | 310/91 |

FOREIGN PATENT DOCUMENTS

| | | | |
|---|---|---|---|
| 16318 | 7/1956 | Fed. Rep. of Germany | 310/261 |
| 1904865 | 8/1970 | Fed. Rep. of Germany | 310/261 |
| 700672 | 3/1931 | France | 310/261 |

*Primary Examiner*—Carl E. Hall
*Attorney, Agent, or Firm*—Vale P. Myles

[57] ABSTRACT

A rotor assembly for a dynamoelectric generator having a spider sub-assembly that is rotatable around a non-vertical axis; characterized by having a plurality of articulated key assemblies positioned in aligned keyways formed, respectively, in the circumferential surface of the spider sub-assembly and in the inner circumferential surface of an annular laminated rotor rim. A base member in each of the key assemblies is formed to exceed by a predetermined length the normal, i.e., unheated, spacing between the rotor rim and the spider. The rotor rim is heated to expand it radially so the base members of the key assemblies can be inserted in the aligned axial keyways in the rim and spider, then the rim is cooled to heat-shrink it against the base members of the key assemblies. Pairs of tapered wedge keys are installed on opposite sides of the neck portions of each T-shaped base member of the respective key assemblies thereby to secure the laminations of the rim in aligned position and to lock the rim against tangential movement relative to the spider.

2 Claims, 7 Drawing Figures

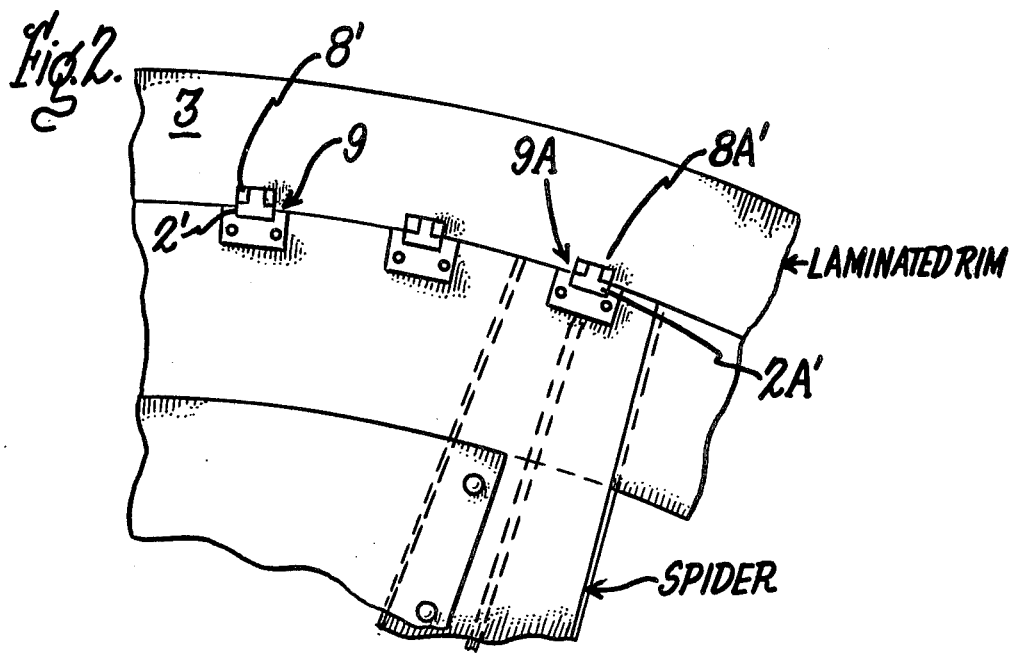
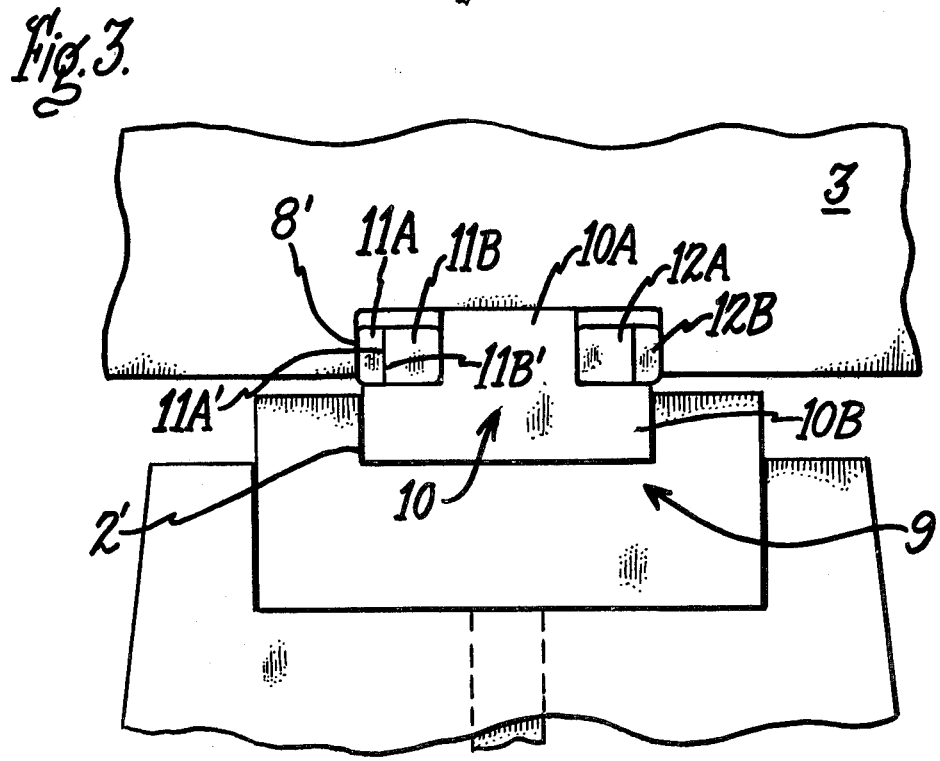

METHOD OF MAKING MOUNTING ASSEMBLY FOR LAMINATED ROTOR RIM OF DYNAMOELECTRIC GENERATOR ROTATABLE ABOUT INCLINED SHAFT

This is a division of application Ser. No. 778,096, filed Mar. 16, 1977, now U.S. Pat. No. 4,110,652.

BACKGROUND OF THE INVENTION

The invention relates to dynamoelectric machine rotor assemblies and methods of making same, and more particularly, it relates to a segmented, laminated rim that is secured in an optimum fixed relationship to a spider by a plurality of articulated key assemblies. Pursuant to the method of the invention, a base member of each key assembly is secured by a heat-shrinking operation in axially aligned keyways formed, respectively, in the spider and the inner circumferential surface of the laminated rim.

It is common practice in the manufacture of large-diameter rotors for dynamoelectric generators to utilize locking keys between the rotor spiders and rim laminations in a manner that enables the keys to be driven with a slight force fit into aligned keyways in the spider and the rim laminations. Such a manufacturing procedure is completely acceptable for generators that are designed for rotation around a vertical axis, because any radial expansion of the rim laminations that may be caused by centrifugal forces in the rotor assembly during its operation do not cause undesirable wear or other operating problems. However, it has been discovered that when such prior art designs or manufacturing methods are employed to fabricate generator rotors that are designed to rotate around a non-vertical axis, wear-producing movement will result between the rim laminations and the rotor spider. This undesirable relative movement is due to a combination of centrifugal force and gravitational force operating on the rotor as it is spun around the non-vertical axis of the machine.

In fact, it has been found that in addition to the resultant so-called bicycle chain effect between the laminated rim and the spider on which it is mounted, further undesirable relative movement occurs in such machines between the individual rotor rim laminations. Specifically, this second type of movement involves sliding or skewing of the segmented rim laminations relative to one another due to the typically loose tolerances allowed in prior art rotor keying arrangements. Because of such loose tolerances and the types of key structures employed heretofore, each rim lamination segment is not held in direct contact with a key to prevent it from sliding or skewing relative to other rim laminations.

A typical prior art procedure used to avoid skewing between adjacent rim laminations of segmented rotor assemblies of a kind normally fabricated on-site, requires the performance of relatively expensive machining operations by which the irregular sidewalls of keyways in the rim laminations are smoothed to within close tolerances of the width of associated keys. Accordingly, when the keys are positioned in the keyways they closely abut essentially all of the laminations and prevent relative movement between them. Of course, such machining operations make it necessary to provide a large vertically reciprocable planning tool at the often-remote sites where such relatively large diameter, segmented rim assemblies are normally fabricated, thus creating an undesirably high manufacturing cost that should preferably be avoided if possible.

It is also known in the prior art to manufacture relatively small-diameter dynamoelectric generators by heat-shrinking rotor laminations directly onto a shaft to secure them and prevent the above-mentioned looping or bicycle chain effect caused by centrifugal and gravitational forces brought to bear on the laminations when the rotors are turned at high speeds. As stated above though, it has been found that if the same type of heat shrinking fabrication methods are applied to make a large-diameter rotor of the type commonly useful for non-vertical shaft hydraulic turbine generators, it is necessary to provide an undesirably heavy and expensive spider structure to support the resultant high radial compressive forces necessarily created by such typically large magnitude heat shrinking processes on the laminated rim to assure its fixed relationship with the spider when the rotor is turned on its non-vertical axis. To the extent that the number of spokes in such a spider can be reduced, the resulting cost of manufacture of the generator can be minimized, thus, it is advantageous to employ a method for securing segmented rim laminations to relatively large-diameter spiders of non-vertical shaft generators by some other means than the conventional heat-shrinking processes currently employed in making smaller diameter, horizontally mounted dynamoelectric generators.

In terms of generator size, it should be understood that the present invention is particularly applicable to relatively large-diameter generator rotors such as those having diameters in excesss of twenty feet. Such relatively large-diameter rotor structures normally employ radial spokes in the spider to minimize the overall weight and cost of manufacture of the rotor assembly, as distinguished from smaller diameter dynamoelectric generators that typically have a solid rotor core. The present invention enables the use of such a relatively lightly spoked, large-diameter rotor assembly while overcoming the aforementioned disadvantages of centrifugal and gravitational forces loosening the rim laminations, or skewing them relative to one another during normal rotation of the rotor around a non-vertical axis.

OBJECTS OF THE INVENTION

A primary object of the invention is to provide a rotor assembly for a dynamoelectric generator that obviates the above-mentioned disadvantages and shortcomings of prior art rotor assemblies while affording an economically feasible method and construction for manufacturing relatively large-diameter rotor assemblies that are designed for rotation around a non-vertical axis.

Another object of the invention is to provide a rotor assembly that is characterized by including a plurality of articulated key assemblies that operate to securely fasten segmented rotor rim laminations in fixed position relative to a rotor spider so that the laminations cannot move in either radial or tangential directions relative to the spider.

Yet another object of the invention is to provide a keying means for a dynamoelectric machine rotor rim assembly that is effective to prevent any skewing movement between respective segmented laminations of the assembly during normal operation of the machine.

Still another object of the invention is to provide a method for manufacturing a relatively large-diameter, rotor spider and laminated rim assembly that is adapted for rotation around a non-vertical axis. The disclosed method provides a plurality of precisely machined, articulated key assemblies that are secured by a heat shrinking process in aligned keyways between a laminated rotor rim and a rotor spider in a manner such that both radial movement of the rim and skewing movement between the individual rim laminations is prevented.

Additional objects and advantages of the invention will be apparent to those skilled in the art from the description of it presented herein.

SUMMARY OF THE INVENTION

In one preferred form of the invention a rotor assembly for a dynamoelectric generator having a spider sub-assembly that is rotatable around a non-vertical axis is provided with a laminated, segmented rim secured to the spider by a plurality of articulated key assemblies that effectively prevent either radial or tangential movement between the rim laminations and the spider. A precision heat shrinking process is used to secure a base member of each of the key assemblies in axially aligned keyways formed, respectively, at spaced points on the rotor spider and the inner circumferential surface of the rotor rim laminations. Pairs of tapered wedge keys are positioned on each side of the respective key base members, between them and the sidewalls of the respective associated keyways formed in the rim laminations in order to force the laminations into alignment and secure them in such an aligned position against any relative motion that might otherwise occur during operation of the rotor.

Pursuant to the method of the invention each of the base members of the articulated key assemblies is formed to have a precise thickness relative to the distance between the bases of the axially aligned pairs of keyways in the rotor spider and the laminated rotor rim. The predetermined thickness selected for each of the base members of the key assemblies is sufficient to lock the rim laminations against relative radial or tangential movement when the rim is heat-shrunk, in accordance with the process of the invention, against the key base members.

BRIEF DESCRIPTION OF THE DRAWING

FIG. 2 is a fragmentary top view of a portion of the spider assembly shown in FIG. 1, shown with respect to a laminated rotor rim mounted thereon and showing a plurality of articulated key assemblies used to lock the rotor rim laminations in fixed position relative to one another and to the spider pursuant to the present invention.

FIG. 3 is an enlarged view of a fragment of the rotor illustrated in FIG. 2, depicting characteristic details of one of the articulated key assemblies of the invention relative to portions of the rotor rim laminations and spider associated therewith.

DESCRIPTION OF THE PREFERRED EMBODIMENTS

Figure 1:
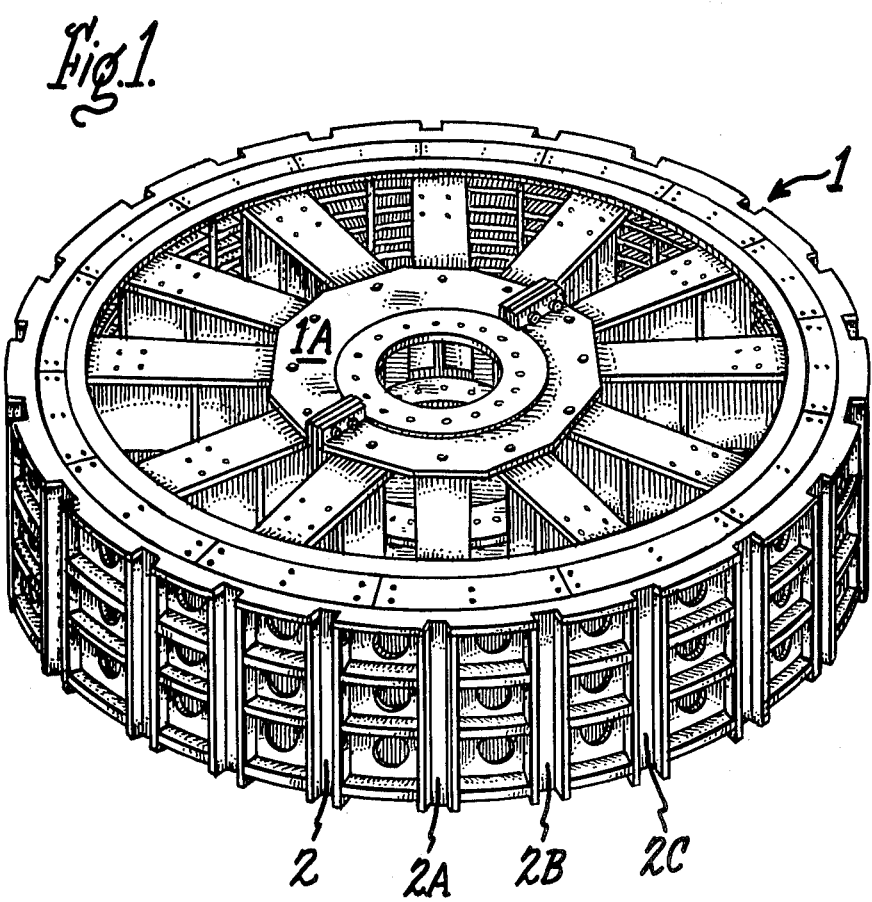
FIG. 1 is a perspective view of a rotor spider assembly for a relatively large-diameter dynamoelectric generator of a type that is adapted to rotate around a non-vertical axis.

Referring now to FIG. 1 of the drawing it will be seen that there is shown a fabricated rotor spider 1 that is formed in a relatively conventional manner of steel plate welded and bolted together as shown to provide a sufficiently sturdy support structure for a laminated magnetic rim which will be more fully described below. For purposes of understanding the present invention, it should be appreciated that the bore through the hub portion 1A of sub-assembly 1 is adapted to receive a rotor shaft (not shown) which is designed for rotation around a non-vertical axis. Thus, during operation of a dynamoelectric generator within which sub-assembly 1 is designed to operate, the spider wil be inclined relative to vertical and horizontal axes. For example the axis of rotation of the subassembly 1 will typically be inclined at an angle of 60° relative to a vertical axis.

In order to support a laminated, segmented magnetic rim on the rotor spider, a first plurality of axial keyways 2, 2A, 2B, 2C, etc., are formed by a suitable machining operation at spaced points around the outside diameter of the spider as shown in perspective in FIG. 1 and in more detail in FIG. 2. It will be understood that each keyway in the first plurality of keyways is substantially identical to the other keyways therein. Thus, the keyways 2' and 2A' shown in FIG. 2 are substantially identical to the remaining keyways in the spider. Consequently, a description of the invention relative to the articulated key assembly used in keyway 2' will suffice to explain to those skilled in the art the novel features of the structure and function of the invention.

A segmented, laminated magnetic rim 3 (see FIG. 2) is disposed around the spider 1 and held concentric therewith by a plurality of articulated key assemblies that will be described more fully below. In order to assure comprehension of the objects and advantages of the present invention, brief reference may be had at this point to FIGS. 4 and 5 of the drawing which illustrate features of the laminated rim 3 that emphasize the importance of the invention. As stated at the outset, the present invention is particularly suitable in the manufacture of relatively large-diameter rotors, i.e., those having a diameter in excess of 20 feet. The laminated rotor rims for such large dynamoelectric generators are formed of a plurality of overlapping segments, such as the punched steel segment 4 shown in FIG. 4. A sufficient number of such segments are stacked on dowels, with each segment staggered relative to the segments on either side of it, so that the combined segments and dowels form a substantially continuous magnetic flux path around the rotor. This rotor lamination stacking operation is normally performed at the installation site for a large diameter generator, after the rotor spider 1 has been fabricated in sections at a factory, shipped to the site, and bolted together to form a complete subassembly of the type illustrated in FIG. 1. Thus, after a suitable number of lamination segments are stacked on the dowels 5, 5A, 5B, etc., a pair of end plates or pressure plates 6A and 6B, as shown in FIG. 5, are mounted over the stacked segments and compressed together by tightening threaded nuts 7, 7A, 7B, etc., onto the dowels in a manner wellknown in the art.

Figure 4:
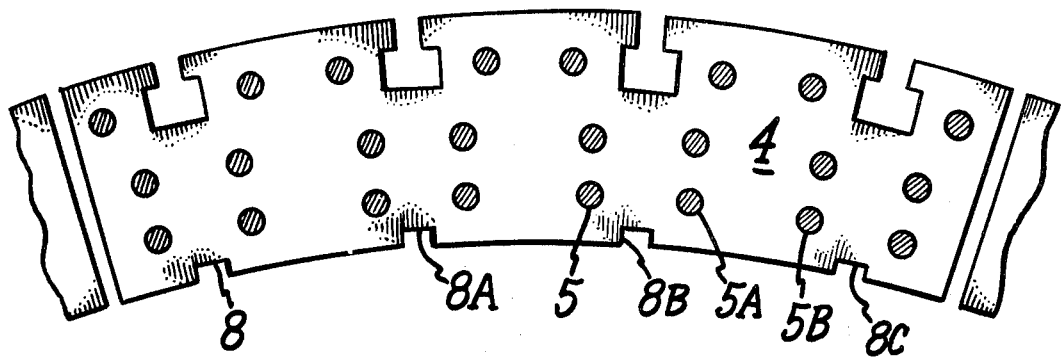
FIG. 4 is a top view of a typical rotor rim segment such as that utilized to form the laminated rim illustrated in FIGS. 2 and 3.
Figure 5:
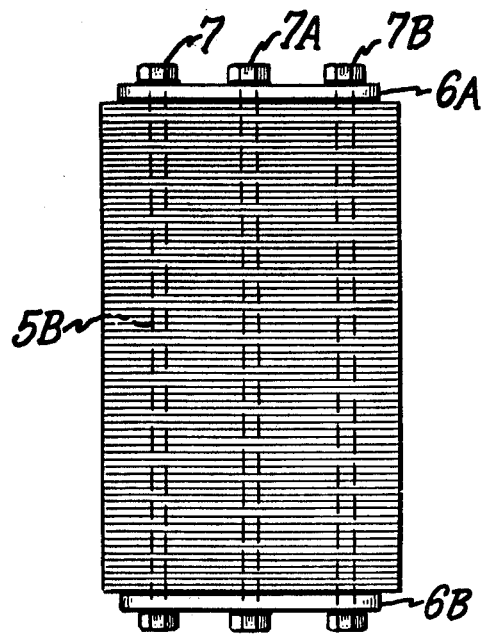
FIG. 5 is a cross-sectional view of the laminated rotor shown in FIG. 2 illustrating a relatively conventional means for securing such laminations in a suitably compressed position for normal operation.

For the purposes of the present invention each of the rotor segments (4, etc.) is provided with a second plurality of keyways 8, 8A, 8B, etc., that are formed by machining or other suitable means at spaced points around the inner circumferential surface of each segment, as clearly shown in FIG. 4. Accordingly, when the respective rotor segments (4, etc.) are stacked on the dowel pins 5, 5A, 5B, etc., as shown in FIG. 5, the respective keyways in the individual rotor lamination segments will be held in general alignment by the dowels. As best seen in FIG. 2, when the rim 3 is completely assembled in the manner just described, the second plurality of axial keyways 8', 8A', etc., is formed at spaced points completely around the inner circumferential surface of the laminated rim 3. This spacing of the second plurality of keyways is designed relative to the first plurality of keyways in the spider so that each keyway of the second plurality is positioned in generally axial alignment, respectively, with each keyway of the first plurality of spider 1, as seen in FIG. 2.

Pursuant to the present invention, a plurality of articulated key assemblies 9, 9A, etc., as seen in FIG. 2, are positioned respectively within portions of each of the generally aligned pairs of keyways 2'-8', 2A'-8A', et cetera. This positioning of the key assemblies 9, 9A, etc., serves to prevent relative tangential movement of the laminated rim 3 relative to the spider 1 in the optimum manner that will be more fully described herein after the details of the key assemblies are explained.

FIG. 3 depicts in enlarged detail the characteristic features of one of the key assembly 9. It will be understood that the respective articulated key assemblies of the invention are substantially identical in design and function; accordingly, an understanding of the features of the key assembly 9 will afford those skilled in the art with a comprehension of the functions of the related key assemblies. As seen in FIG. 3, the key assembly 9 and, thus, each of the other key assemblies, comprises a generally T-shaped base member 10 having a neck portion 10A and a T-bar portion 10B that are designed to extend for the full length of the keyway 8' through laminated rim 3. In addition, the key assembly 9 includes two pairs of tapered wedge keys 11A, 11B and 12A, 12B. When the rim 3 is completely assembled in operating position on the rotor spider 1, the pairs of wedge keys are mounted in wedging relationship respectively on opposite sides of the neck 10A of the T-shaped base member 10 of the key assembly, between it and the rim laminations as shown in FIG. 3. In this arrangement the thickest portions of each of the wedge keys in the pairs 11A, 11B and 12A, 12B is positioned respectively adjacent opposite sides of the rim 3, thereby to secure the laminations in accurate alignment along the keyway 8' while simultaneously fixing the laminations in position relative to the spider sub-assembly 1.

The method of the invention by which the key assembly base member 10 is secured in the keyway 2' of the spider will be more fully described below; however, at this point in order to fully comprehend the nature of the structural features of the invention it should be appreciated that the base key member 10 is pressed into the keyway 2' by having the rim 3 heat-shrunk against the base key member 10 after it is inserted into the keyway 2'. With that relationship in mind, a further description of the preferred embodiment of the articulated key assembly 9 will now be given with reference to FIG. 7.

Figure 6:
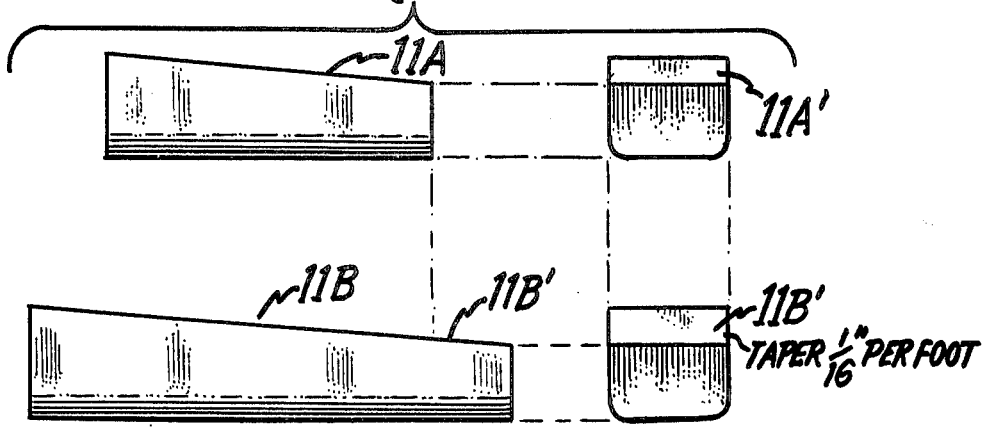
FIG. 6 is a combined side elevation and end view of a pair of tapered wedge keys formed pursuant to the present invention.

Since each pair of the wedge keys of the invention is substantially identical in form, only one pair of the wedge keys is shown in FIG. 6 for purposes of describing the characteristic features of all of the wedge keys used in this embodiment of the invention. Thus, wedge keys 11A and 11B are shown respectively in side elevation and end views, as illustrated in the drawing. In this embodiment of the invention the ends of each of the wedge keys are generally parallel to one another and are perpendicular to three of the sides thereof, while a fourth side of each wedge key is made to taper about 1/16 inch per foot of length of the key relative to the opposite sides thereof. When the wedge keys are assembled pursuant to the teaching of the invention, as shown in FIGS. 2 and 3, the tapered sides 11A' and 11B' of each of the wedge keys is positioned against the tapered side of the other wedge key in its associated pair; thus, tapered sides 11A' and 11B' would be juxtaposed as shown in FIG. 3. Also, each of the tapered wedge keys is designed to have sufficient length so that their outer ends can be trimmed in a plane closely parallel to the plane defined by the closest outermost rotor lamination. Likewise, the T-shaped base member 10 of the key assembly 9 and each of the other key assemblies, as well as at least one wedge key in each pair of the associated wedge keys are formed to be at least as long as the length of the spider keyway 2'. These relative lengths afford contact between each lamination of the rim and the outermost wedge keys, thereby to prevent skewing of the laminations relative to one another when the respective pairs of wedge keys 11A, 11B and 12A, 12B are driven into their respective keyways; for example, into keyway 8' shown in FIG. 3, to force the individual rotor lamination segments into alignment along the straight outermost edges of wedge keys 11A and 12B, respectively, It should be recognized that by providing such an articulated key assembly, it is possible to accurately align the individual rim segments to the spider 1 along each wedge key, in the manner just described, without having to accurately machine the keyways 8, 8', 8A', etc., in the rim 3. Another important feature of each of the articulated key assemblies is that each of the base members, such as the base member 10 shown in FIG. 3, is made to have a thickness (in a radial direction) greater by a predetermined amount than the combined heights of the aligned keyways 2' in the spider 1 and 8' in the rim 3 in which the base member 10 is positioned. This critical relative dimensioning is provided to enable the base members to hold the rotor laminations away from the key bars in spider 1 by that predetermined amount. In addition, each key base member is machined to a predetermined thickness such that said predetermined amount of spacing is sufficient to prevent radial movement between the rim and spider when the rim is heat-shrunk against the base members. In the most preferred form of the invention the predetermined height by which each T-shaped base member 10 exceeds the distance between the bottoms of the aligned keyways, when the temperature of the laminated rim is substantially the same as the temperature of the rim is in the range of about .06 to about 0.09 inches. It has been found that this desirable range enables the articulated keys to securely position the laminated rim 3 against radial movement when the rim is heat shrunk against the keys on such a large diameter (20 feet or more)

spider, then subjected to centrifugal and gravitational forces during operation of the rotor. At the same time, this critical dimensioning avoids the application of undesirably large compressive stresses on the spider of the sub-assembly 1; accordingly, it is not necessary to provide an undesirably heavy hub, spider and rim sub-assembly in order to withstand these compressive forces.

It has been found that with this design of the invention the tapered wedge keys are securely held in position when they are driven against one another as shown in FIG. 3, due to the relatively small taper of 1/16 inch per foot along the length of the wege keys. On the other hand, it has been found that any significantly greater taper along the edges of the wedge keys may cause them to vibrate loose during normal operation of the machine, so such steeper tapers should be avoided in alternative embodiments. Otherwise, it may be necessary to clamp the wedge keys in their operating position by securing plates over the outer ends thereof and fastening them to the rim 3 with bolts in the pressure plates, or with other suitable securing means. In the preferred embodiment of the invention the component parts of each of the articulated key assemblies is formed of machined steel but those skilled in the art will recognize that various modifications and improvements may be made relative to the particular form of the invention shown without departing from the true scope of the invention.

A further important feature of the articulated key assemblies of the invention is the relative thickness (in a radial direction) of sections of the base members (10, etc.) relative to the keyways in which they are disposed, for example, as seen in FIG. 3. Pursuant to the present invention, the thickness of the T-bar portion of each of the T-shaped members 10 is greater than the height of the spider keyway (2') in which it is positioned, and the thickness (in a radial direction) of each neck portion 10A of each of the T-shaped members 10 is greater than the height of the rim keyway (8') in which it is disposed. The thickness of each of said wedge keys measured radially with respect to the rim is made less than the radial thickness of the neck portion of this T-shaped base member disposed in juxtaposition with it. This relative dimensioning of the component parts makes it possible to drive the wedge keys between the rim laminations and the adjacent T-shaped base member 10 without having forward movement of the keys restricted significantly by frictional drag on either the T-bar portion of the base member or the bottom of an associated keyway, such as keyway 8', shown in FIG. 3.

Figure 7:
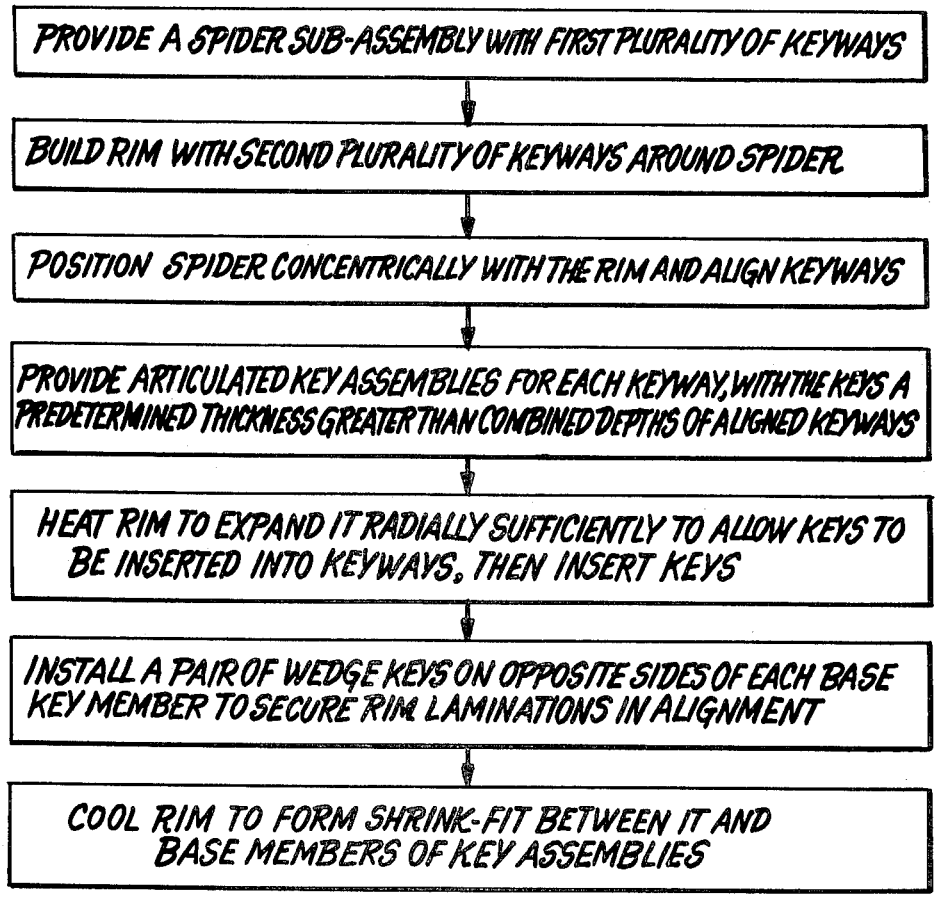
FIG. 7 is a chart listing the sequential steps of a preferred form of the method of the invention.

Now, with an understanding of the desirable structural features of the invention in mind, a description of the method of the invention will be given with reference to FIG. 7. As indicated above, the method is best suited for use in assembling on-site a laminated, segmented rotor rim assembly having a relatively large diameter spider, i.e., a spider having a diameter in excess of 20 feet. Pursuant to the method of the invention, as illustrated by the step-chart in FIG. 7, one first provides a spider sub-assembly that is operable for rotation around a non-vertical axis with a first plurality of axial keyways formed around the periphery thereof. Then, a laminated annular rotor rim is built up around the spider by placing a plurality of laminated segments on dowel pins or bolts and securing them together in the manner described above with reference to FIGS. 4 and 5. This operation forms a second plurality of axial keyways at spaced points around the inner circumference of the laminated annular rotor rim since keyway-forming slots are pre-stamped (or machined) at spaced intervals in each of the lamination segments, as explained above. The spider is accurately positioned concentric with the rim sub-assembly and each keyway in the spider is positioned in general axial alignment, respectively, with the keyways in the rim. A plurality of articulated key assemblies are provided, each including a generally T-shaped base member and two pairs of tapered wedge keys. As explained above, each base member of the articulated key assemblies is formed to have a thickness that is a pre-determined amount greater than the distance between the bottoms of the aligned keyways into which it is positioned. In the most preferred form of the invention, assuming the rotor mean diameter is approximately 25 feet, each of the base members of the articulated key assemblies is machined to a thickness (measured radially) that exceeds the spacing between the bottoms of the aligned keyways within which it is to be positioned by approximately 0.07 inches. However, it has been found that by making each of the base members substantially identical in radial thickness and within a range of 0.06 to 0.09 inches, the objectives of the invention can be afforded whereby adequate pre-stressing is applied to the rim 3 to prevent it from being loosened by centrifugal and gravitational forces during its rotation, while at the same time avoiding the build-up of undesirably large compressive stresses on the spider when the rotor rim is heat-shrunk into operating position against the articulated keys.

Next, the rim 3 is heated to expand it radially a distance sufficient to enable a base member of each articulated key assembly to be positioned, respectively, in each of the generally aligned keyways, with the T-bar portion of each base member positioned respectively in each of the spider keyways, such as the keyway 2', shown in FIG. 3. After the base members of each of the keys is inserted into their respective keyways, a pair of tapered wedge keys is installed on each side of the neck portion of each of the base members, with the thick ends of each pair of wedge keys disposed adjacent opposite sides of the rotor rim, in order to secure the rim laminations in fixed relationship with respect to one another and the spider. Finally, the rim is cooled to form a heat-shrink fit between it and each of the T-shaped base members of the key assemblies so that the rotor rim laminations are securely locked in position.

It will be seen from the foregoing description of the preferred steps of the method of the invention that it is possible to form a rotor assembly without having to accurately machine the keyways 8, 8A, etc. formed in the inner circumferential surface of the rims. In fact, though, it may be desirable in practicing the invention in certain applications to provide a preliminary alignment of the rim laminations, for example, by driving tapered wedge keys into the second plurality of keyways 8, 8A, etc., prior to the time that the rim 3 is heat-shrunk in operating position against the respective base members 10 of the articulated key assemblies. When such a preliminary alignment of the laminations is attained, it is desirable to permanently install the tapered wedge keys 11A, 11B and 12A, 12B, etc., after the laminated rim segments are compressed against the base member 10 of the articulated key assemblies. It should also be mentioned that assembly of the articulated keys pursuant to the method of the invention is facilitated by making both the individual key base members and at least one of the tapered wedge keys in each pair of wedge keys somewhat longer than keyways 2' and 8', etc., in which they are to be disposed. This excessive length facilitates handling during installation; however, when the machine is finally assembled the outer ends of the articulated key members are trimmed to a plane substantially flush with the outer laminations of the rotor rim 3.

Those skilled in the art will recognize that other modifications and alternative forms of the invention, may be developed from the teaching of it presented herein; accordingly, it is my intention to encompass the true spirit of the invention within the scope of the following claims.

What I claim as new and desire to secure by Letters Patent of the United States is:

1. A method for manufacturing a rotor for a dynamoelectric generator comprising the steps of:
    (a) providing a spider sub-assembly that is rotatable around a non-vertical axis, around
    (b) forming a first plurality of axial keyways in said spider at spaced points around its circumference,
    (c) providing a laminated annular rim having a second plurality of axial keyways formed therein at spaced points around its inner circumference,
    (d) positioning each keyway in said rim in general axial alignment, respectively, with a keyway in said spider, so the rim in concentric with the spider,
    (e) providing a plurality of articulated key assemblies, each including a generally T-shaped base member and two pairs of tapered wedge keys, and forming each of said base members to have a thickness a predetermined amount greater than the distance between the bottoms of said aligned keyways when the temperature of the rim is substantially the same as the temperature of said spider,
    (f) heating said rim to expand it radially a distance great anough to enable each of the base members of the articulated key assemblies to be positioned, respectively, in each of the generally aligned keyways, with the T-bar portion of each base member positioned, respectively, in one of the spider keyways,
    (g) installing a pair of tapered wedge keys on each side of the neck portion of each of said base members, with the thick ends of each pair of wedge keys disposed adjacent opposite sides of the rim, thereby to secure the rim laminations in fixed relationship with respect to one another and to the spider, and
    (h) cooling the rim to form a heat-shrink fit between it and each of the T-shaped base members of the key assemblies.

2. A method as defined in claim 1 wherein the predetermined amount that each T-shaped base member exceeds the distance between the bottoms of the aligned keyways in which the key assemblies are to be fitted is in the range of 0.06 to 0.09 inches.

* * * * *